US006983160B2

(12) United States Patent
Drawert

(10) Patent No.: US 6,983,160 B2
(45) Date of Patent: Jan. 3, 2006

(54) BASE SITE AND METHOD FOR GPS-BASED REGIONAL TIME SYNCHRONIZATION

(75) Inventor: Bruce M. Drawert, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 631 days.

(21) Appl. No.: 10/002,727

(22) Filed: Oct. 25, 2001

(65) Prior Publication Data
US 2003/0083103 A1 May 1, 2003

(51) Int. Cl.
H04B 15/00 (2006.01)
(52) U.S. Cl. ............... 455/502; 455/503; 455/561; 455/550.1; 455/13.2; 455/12.1; 370/350; 370/503; 370/324; 375/272; 375/354
(58) Field of Classification Search ............ 455/502, 455/561, 13.2, 456.1, 550.1, 501, 503, 12.1; 701/214, 215; 370/350, 503, 324; 342/387; 375/372, 354
See application file for complete search history.

(56) References Cited

U.S. PATENT DOCUMENTS

| 5,712,867 | A | * | 1/1998 | Yokev et al. ............ 375/136 |
|---|---|---|---|---|
| 5,899,957 | A | * | 5/1999 | Loomis .................. 701/214 |
| 6,128,501 | A | * | 10/2000 | Ffoulkes-Jones ......... 455/456.3 |
| 6,239,748 | B1 | * | 5/2001 | Gilhousen ............... 342/442 |
| 6,256,507 | B1 | * | 7/2001 | Lemieux ................. 455/502 |
| 6,603,978 | B1 | * | 8/2003 | Carlsson et al. .......... 455/502 |
| 6,665,541 | B1 | * | 12/2003 | Krasner et al. ............ 455/502 |
| 6,741,935 | B1 | * | 5/2004 | Eschenbach ............. 701/215 |
| 6,771,625 | B1 | * | 8/2004 | Beal .................... 370/336 |
| 2001/0039192 | A1 | * | 11/2001 | Osterling et al. ......... 455/502 |
| 2001/0050633 | A1 | * | 12/2001 | Thomas ................. 342/387 |
| 2002/0118723 | A1 | * | 8/2002 | McCrady et al. .......... 375/130 |
| 2002/0123352 | A1 | * | 9/2002 | Vayanos et al. .......... 455/456 |
| 2004/0092275 | A1 | * | 5/2004 | Krasner et al. ............ 455/502 |
| 2004/0213367 | A1 | * | 10/2004 | Han .................... 375/354 |

* cited by examiner

Primary Examiner—Sonny Trinh
Assistant Examiner—Khai Nguyen
(74) Attorney, Agent, or Firm—Jeffrey K. Jacobs

(57) ABSTRACT

To address the need for an apparatus and method of economically synchronizing base sites (110–113) in wireless communication systems, the present invention provides a GPS-based solution for synchronizing slave sites (111–113) to a regional master site (110). In general, the master site reports to the slave sites information indicating the timing variance of GPS satellites (101–105). The slave sites then use this information in combination with information they collect from the same satellites to periodically resynchronize their clocks to the master clock.

18 Claims, 2 Drawing Sheets

BASE SITE AND METHOD FOR GPS-BASED REGIONAL TIME SYNCHRONIZATION

FIELD OF THE INVENTION

The present invention relates generally to wireless communication systems and, in particular, to GPS-based regional time synchronization.

BACKGROUND OF THE INVENTION

Wireless communications systems that use the Global Positioning System (GPS) to synchronize their base sites are limited to timing accuracies only to within 340 nanoseconds. This accuracy is insufficient for implementations of the Emergency 911 location service required by the U.S. federal government. In fact, to have mobile units perform self-location cheaply requires synchronized broadcasts by base sites, accurate to approximately 30 nanoseconds. Prior art solutions such as equipping mobile units with GPS receivers or deploying differential GPS (DGPS) equipment and subscribing to DGPS service are not economically viable in the competitive wireless marketplace. GPS receivers would add at least $30 to the cost of each mobile unit, while DGPS equipment and subscriptions would need to be purchased for each base site. Therefore, a need exists for an apparatus and method of economically synchronizing base sites in wireless communication systems.

DESCRIPTION OF A PREFERRED EMBODIMENT

To address the need for an apparatus and method of economically synchronizing base sites in wireless communication systems, the present invention provides a GPS-based solution for synchronizing slave sites to a regional master site. In general, the master site reports to the slave sites information indicating the timing variance of GPS satellites. The slave sites then use this information in combination with information they collect from the same satellites to periodically resynchronize their clocks to the master clock.

Figure 1:
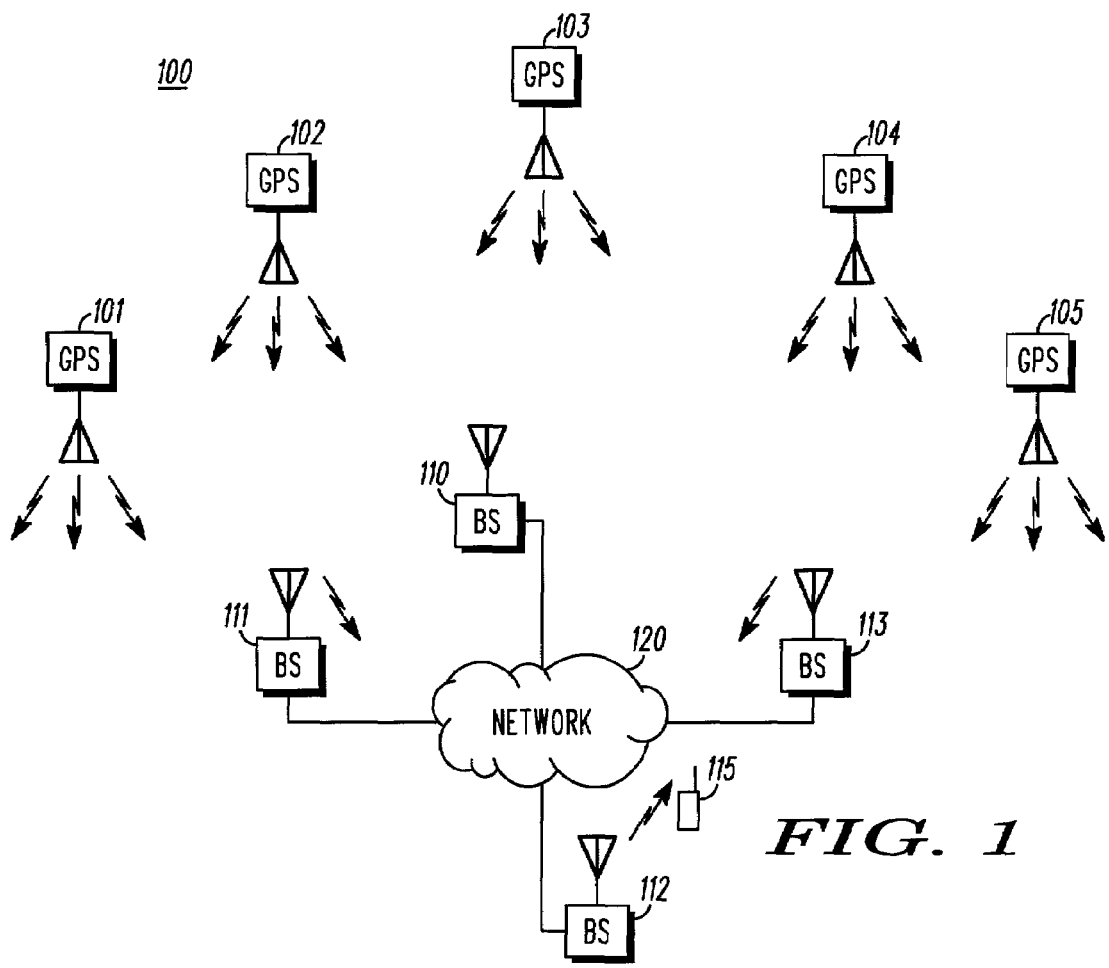
FIG. 1 is a block diagram depiction of a wireless communication system in accordance with a preferred embodiment of the present invention.

The present invention can be more fully understood with reference to FIGS. 1–4, wherein like numerals designate like components. FIG. 1 is a block diagram depiction of wireless communication system 100 in accordance with a preferred embodiment of the present invention. System 100 comprises GPS satellites 101–105, master site 110, base sites 111–113, network 120, and mobile unit 115. The number of GPS satellites, base sites, and mobile units shown in FIG. 1 has been chosen for illustrative purposes only. FIG. 1 does not realistically represent an actual system, but rather the components most desirable for describing a preferred embodiment of the present invention.

Preferably, system 100 comprises an "iDEN" communication system, commercially available from Motorola, Inc. of Schaumburg, Ill., adapted to implement the present invention. Base sites 111–113 are preferably "iDEN" Enhanced Base Transceiver System (EBTS) sites, mobile unit 115 preferably comprises an "iDEN" wireless phone, and network 120 preferably comprises an inter-site network typical of those that support "iDEN" EBTSs. Master site 110 uses a nanosecond-accurate clock (e.g., a Cesium or Rubidium atomic clock) instead of a quartz clock like those preferably used by base sites 111–113. Moreover, master site 110 is ideally located at a relatively high elevation with a clear view of the horizon in all directions. This allows the master site GPS receiver to obtain a low Geometric Dilution of Precision (GDOP). Finally, although the master site should not be near too much RF interference, it will likely double as EBTS for the system.

Figure 2:
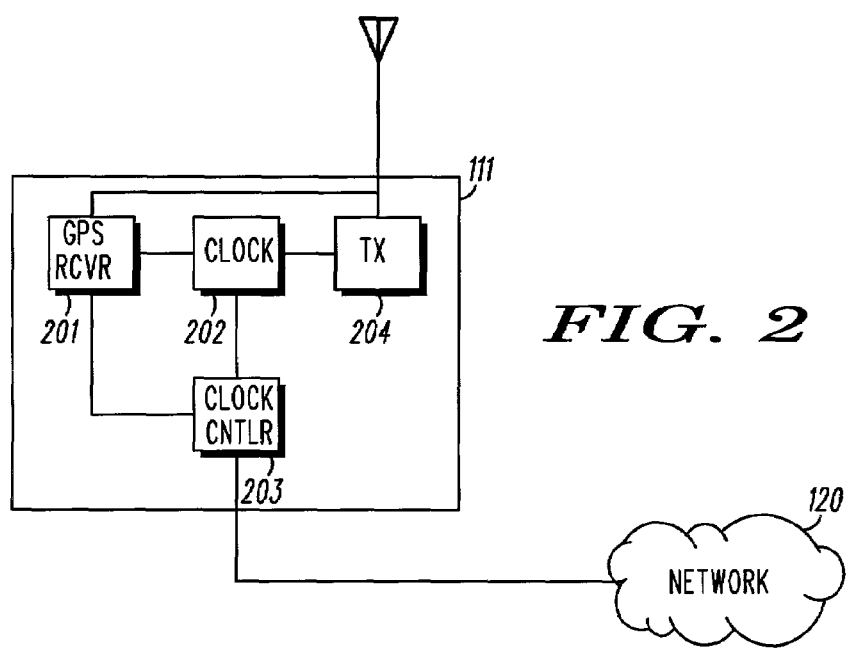
FIG. 2 is a block diagram depiction of a slave site in accordance with a preferred embodiment of the present invention.

For time-keeping purposes, base sites 111–113 are considered slave sites to master site 110. FIG. 2 is a block diagram depiction of slave site 111 in accordance with a preferred embodiment of the present invention. Slave site 111 comprises a GPS receiver 201, a clock 202 (preferably a quartz-based clock), a clock controller 203, and a transmitter 204. Base sites in general and GPS receivers, clocks, and transmitters in particular are all well known in the art. Clock controller 203 preferably comprises one or more memory devices and processing devices such as a microprocessor and a computer memory. In the preferred embodiment, under the control of software/firmware algorithms stored in the memory devices of base site 111, base site 111 performs those tasks required for well-known base site operation and, additionally, the method described relative to FIG. 4. Likewise, master site 110, under the control of software/firmware algorithms stored in its memory devices, preferably performs those tasks required for well-known base site operation and, additionally, the method described relative to FIG. 3.

Operation of preferred system 100, in accordance with the present invention, occurs substantially as follows. During an initialization period, sites 110–113 each receive position and time information from as many GPS satellites as each can monitor, and each preferably synchronizes its clock to the time determined from the satellites monitored. Thus, sites 110–113 achieve "GPS-time" synchronization, as prior art communication systems do today. However, because of GPS Selective Availability (SA), individual GPS satellites corrupt the position and time information they broadcast according to military codes. Furthermore, the ionospheric-tropospheric effects of the atmosphere on the broadcast signals also distort the "GPS-time" determination. The clocks of sites 110–113 are therefore only roughly synchronized.

To achieve greater synchronization, slave sites 111–113 stop adjusting their clocks to concur with "GPS-time" and instead record information indicated by the satellites within their view. Slave site 111, for example, stores information indicating the time provided by clock 202 and how clock 202's time differs from the time-of-day reported by GPS satellite 101. Clock controller 203 adjusts the satellite time-of-day by adding the transit time from satellite 101 to site 111 and stores this result with the clock 202 time of receipt. (The transit time can be easily determined since site 111's position is known from survey data, satellite 101's position is known from the broadcast, and the speed of light is known.) The clock 202 time of receipt is the time that quartz clock 202 indicated when satellite position and satellite time-of-day information were received by GPS receiver 201. Preferably, clock controller 203 then continues periodically to collect and record this information from each satellite that GPS receiver 201 is able to monitor.

After a period of time, clock controller 203 receives from master site 110 via network 120 an indication of a time-of-day error value and a corresponding master site time-of-day, as reported by master site 110's nanosecond-accurate clock. The time-of-day error value is the difference between the master site time-of-day and a satellite time-of-day, received at master site 110 and adjusted for its transit time from satellite 101 to master site 110. Clock controller 203 preferably receives a spreadsheet of this information for each satellite that master site 110 is able to monitor.

Using the information from master site 110 and the information previously stored, clock controller 203 determines a clock correction value that it uses to synchronize clock 202 with the master site clock. Preferably, this synchronization is accomplished by software/firmware within clock 202, although it is understood that clock behavior could also be physically changed, as by changing the temperature of or the voltage applied to the quartz oscillator.

Depending on the desired accuracy of clock 202, the clock correction value may comprise a simple offset to be added to or subtracted from clock 202's time-of-day. For this implementation, master site 110 and slave site 111 would be programmed to monitor a particular satellite (or all the satellites) at the same time (according each's respective site clocks). The information stored for that time by clock controller 203 would indicate the differences between the time broadcast by each satellite and clock 202's time-of-day, and the spreadsheet from master site 110 would indicate the differences between the time broadcast by each satellite and the master clock's time-of-day. Thus, an average difference between clock 202's time-of-day and the master clock's time-of-day could be determined and used as the clock correction value. Clock controller 203 would then periodically receive a new spreadsheet from master site 110 and re-synchronize clock 202 accordingly.

For better accuracy of clock 202 but at the expense of additional complexity, the clock correction value could instead comprise both an offset component and a clock behavior component. All the information stored by clock controller 203 and the information received from master site 110 would be analyzed using well-known curve-fitting and extrapolation techniques. In this manner, the offset between the master clock and clock 202 at that moment and a description of the clock's expected behavior going forward could be determined. For example, an expected rate of change relative to the master clock could be determined and used for extrapolation. To assist clock controller 203 in analyzing clock 202's behavior relative to the master site clock, master site 110 could also include rate-of-change of the time-of-day error values in the spreadsheet it sends slave site 111. Thus, clock controller 203 would synchronize clock 202 using both the offset component and the clock behavior component of the clock correction value determined. Also, with the receipt of each new spreadsheet, clock controller 203 would re-determine a clock correction value and re-synchronize.

The purpose of this continuing re-synchronization of clock 202 to the master site clock is to enable synchronized transmissions by transmitter 204. If slave sites 111–113 are all synchronized to master site 110, then they are all synchronized with respect to each other. This enables wireless unit 115 to use the signals of base sites 111–113 to determine its location by triangulation. The more accurately base sites 111–113 are synchronized, the more accurate is wireless units 115's location determination. To achieve timing synchronization of 30 nanoseconds or better, as would be required for Emergency 911, resynchronization on the order of every 10 minutes or so is expected to suffice. In practice, this period would need to be determined with care, since it can be affected by system-specific variables such as the performance ranges of the clocks involved, the reliability with which particular slave sites can monitor GPS satellites, etc.

Despite the varied performance of their quartz clocks, the corrupted GPS signaling of SA, and any satellite clock anomalies, the resynchronization process of the present invention enables slave sites 111–113 to remain substantially synchronized to master site 110 and enable wireless units like unit 115 to determine their location within the accuracy required by Emergency 911. Because the present invention provides for re-synchronization that is not real-time, the existing inter-site network can be used to communicate synchronization information. Thus, the present invention provides regional synchronization around a master site (for approx. 400 km) that is equipped with little more than an atomic clock and a good view of the horizon. This is a much more economical solution than outfitting a communication system with the prior art DGPS equipment and required DGPS service subscriptions.

Figure 3:
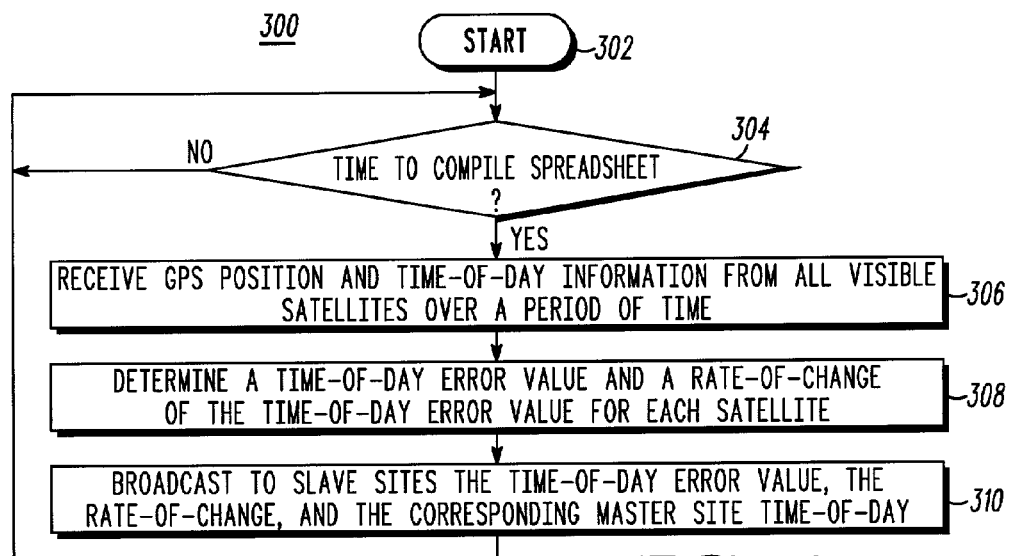
FIG. 3 is a logic flow diagram of steps executed by a master site in accordance with a preferred embodiment of the present invention.

Returning now to the figures, master site 110 can be more fully understood with reference to FIG. 3, a logic flow diagram of steps executed by a master site in accordance with a preferred embodiment of the present invention. Logic flow 300 preferably begins (302) when a master site timer (304) periodically indicates that it is time to compile timing information for the slave sites. As mentioned above, a period of 10 minutes is expected to provide the requisite degree of synchronization, but this may vary from system to system. Over a relatively short period of time (10 seconds, e.g.), the master site receives (306) information from each visible GPS satellite that indicates satellite position and satellite time-of-day. Using each satellite's reported position and each satellite's reported time-of-day, the master site preferably determines (308) for each satellite a time-of-day error value for a particular time during the receiving period and a rate-of-change of the time-of-day error value over the receiving period.

To determine a time-of-day error value, the master site first adjusts the time-of-day reported by a satellite for its transit time from the satellite to the master site. This is very straightforward assuming the master site accurately knows its own location. Ignoring atmospheric effects and SA for the satellite's reported position, the master site just calculates how long a signal at the speed of light would take to travel from the satellite to the master site. The transit time is added to the reported satellite time-of-day and the master site time-of-day corresponding to the receipt of the signal is subtracted from the result. Thus, the time-of-day error value represents the difference between the master site, nanosecond-accurate clock and the satellite's "GPS time," and the rate-of-change of the time-of-day error value represents the rate at which the satellite's "GPS time" is changing with respect to the master site clock.

In the preferred embodiment, once the time-of-day error values and the rate-of-change values for each satellite have been determined, they are compiled together into a spreadsheet-like format and broadcast (310) to all of the slave sites via the network that interconnects them. For each satellite, this spreadsheet preferably contains the determined time-of-day error value, the rate-of-change value, and the master site time-of-day to which these values refer. Because the present invention does not involve real-time synchronization, the delivery of this re-synchronization data to the slave sites is not time critical and need not be collected and broadcast together. Thus, the data for a particular satellite could alternatively be broadcast independent of data for the other satellites.

Figure 4:
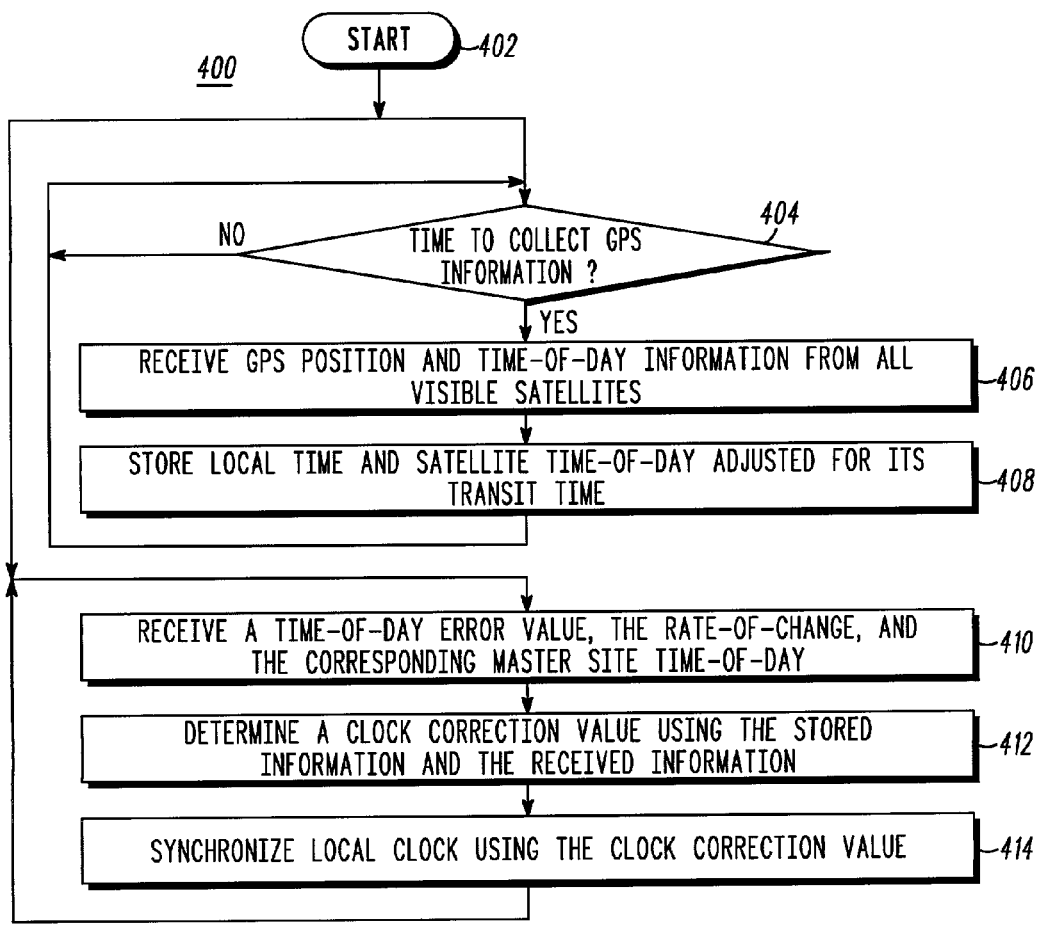
FIG. 4 is a logic flow diagram of steps executed by a slave site in accordance with a preferred embodiment of the present invention.

FIG. 4 is a logic flow diagram of steps executed by a slave site in accordance with a preferred embodiment of the present invention. Logic flow 400 begins (402) when a slave site timer (404) periodically (every minute, e.g.) indicates that it is time to collect GPS information. The slave site then monitors the GPS satellites visible given its location and surroundings, receiving (406) satellite position information and satellite time-of-day information from each. The slave site then stores (408) the time reported by its local clock and information that indicates how this time-of-day differs from the satellite time-of-day. In the preferred embodiment, each satellite time-of-day is adjusted for its transit time from the satellite to the slave site in the same manner as described above with respect to the transit time adjustment by the master site. The slave site then stores the adjusted satellite time-of-day and the corresponding slave site time-of-day.

As the slave site periodically monitors and stores satellite information, it also periodically receives (410) re-synchronization information from the master site. Preferably, for each satellite visible to the master site, this information includes the time-of-day error value, the rate-of-change value, and the master site time-of-day to which these values refer. The slave site then uses the information from the master site and the information it has been storing to determine (412) a clock correction value. As discussed above with respect to FIG. 1, determining this clock correction value may simply include determining the difference between the master clock time-of-day and the local time-of-day, or it may additionally involve determining the expected behavior of the local clock. The slave site, then, synchronizes (414) its clock with the master site clock using this clock correction value.

Because the slave site clocks are cheaper quartz-based clocks, their time-of-day drifts with respect to the master site, nanosecond-accurate clock. Thus, the present invention provides an ongoing re-synchronization process for the slave sites to achieve a desired timing accuracy without costly timekeeping or DGPS equipment.

While the present invention has been particularly shown and described with reference to particular embodiments thereof, it will be understood by those skilled in the art that various changes in form and details may be made therein without departing from the spirit and scope of the present invention.

What is claimed is:

1. A method for GPS-based regional time synchronization comprising:

receiving, at a master site, information from a GPS satellite that indicates a position of the satellite and a satellite time-of-day;

determining, using the position of the satellite and a pre-determined position of the master site, a time-of-day error value that represents a difference between the satellite time-of-day, adjusted for a transit time of the information, and a corresponding master site time-of-day as reported by a master site, nanosecond-accurate clock; and broadcasting to at least one slave site an indication of the time-of-day error value and the corresponding master site time-of-day.

2. The method of claim 1 further comprising the step of repeating the steps of receiving, determining, and broadcasting periodically.

3. The method of claim 2 further comprising the step of repeating the steps of receiving, determining, and broadcasting for each GPS satellite visible to the master site.

4. The method of claim 1 further comprising the steps of:

receiving, over a period of time at the master site, information from the GPS satellite that indicates positions of the satellite and satellite times-of-day;

determining, from the information received over the period of time, a rate-of-change of time-of-day error values; and broadcasting to at least one slave site the rate-of-change of time-of-day error values.

5. The method of claim 1 wherein broadcasting comprises transmitting via an inter-site network.

6. A method for GPS-based regional time synchronization comprising:

receiving, at a slave site and at a time indicated by a slave site clock, information from a GPS satellite that indicates a position of the satellite and a first satellite time-of-day;

storing information that indicates the time indicated by the slave site clock and how the time indicated by the slave site clock differs from the satellite time-of-day;

receiving, at the slave site, an indication of a time-of-day error value and a corresponding master site time-of-day, as reported by a master site, nanosecond-accurate clock, wherein the time-of-day error value represents a difference between a second satellite time-of-day, adjusted for a transit time to the master site, and the corresponding master site time-of-day;

determining a clock correction value for the slave site using the stored information, the time-of-day error value, and the corresponding master site time-of-day; and synchronizing a slave site clock with the master site using the clock correction value.

7. The method of claim 6 wherein the step of storing comprises storing the time indicated by the slave site clock and the satellite time-of-day adjusted for a transit time to the slave site.

8. The method of claim 7 wherein the step of determining comprises determining the clock correction value by using the difference between the time-of-day error value and a slave error value equal to the difference between the time indicated by the slave site clock and the first satellite time-of-day adjusted for the transit time to the slave site.

9. The method of claim 8 wherein the master site time-of-day corresponds to the time indicated by the slave site clock.

10. The method of claim 6 further comprising the step of receiving, at the slave site from a master site, a rate-of-change of time-of-day error value, wherein the rate-of-change of time-of-day error value is additionally used to determine the clock correction value.

11. The method of claim 10 further comprising the steps of:

signaling to wireless units according to the synchronized slave site clock for use in location determination of the wireless unit.

12. A base site comprising:
a GPS receiver arranged to receive information from a GPS satellite that indicates a position of the satellite and a first satellite time-of-day;
a clock coupled to the GPS receiver that indicates a time at which the GPS receiver received the information;
a clock controller, coupled to the GPS receiver and the clock, arranged to store information that indicates the time indicated by the clock and how the time indicated by the clock differs from the first satellite time-of-day, further arranged to receive an indication of a time-of-day error value and a corresponding master site time-of-day, as reported by a master site, nanosecond-accurate clock, wherein the time-of-day error value represents a difference between a second satellite time-of-day, adjusted for a transit time to the master site, and the corresponding master site time-of-day, further arranged to determine a clock correction value using the stored information, the time-of-day error value, and the corresponding master site time-of-day, and further arranged to synchronize the clock with the master site, nanosecond-accurate clock using the clock correction value.

13. The base site of claim 12 wherein the clock comprises a quartz oscillator.

14. The base site of claim 12 wherein the clock controller stores the time indicated by the clock and the first satellite time-of-day adjusted for a transit time to the base site.

15. The base site of claim 14 wherein the clock controller determines the clock correction value by using the difference between the time-of-day error value and a base site error value equal to the difference between the time indicated by the clock and the first satellite time-of-day adjusted for the transit time to the slave site.

16. The base site of claim 15 wherein the master site time-of-day corresponds to the time indicated by the clock.

17. The base site of claim 12 wherein the clock controller is further arranged to receive a rate-of-change of time-of-day error value, wherein the rate-of-change of time-of-day error value is additionally used to determine the clock correction value.

18. The base site of claim 17 further comprising a transmitter arranged to signal wireless units according to the synchronized clock for use in location determination of the wireless unit.

* * * * *